United States Patent
Yamazaki

(10) Patent No.: US 9,834,101 B2
(45) Date of Patent: Dec. 5, 2017

(54) CHARGE CONTROL DEVICE FOR ELECTRICALLY DRIVEN VEHICLE

(71) Applicant: MITSUBISHI JIDOSHA KOGYO KABUSHIKI KAISHA, Tokyo (JP)

(72) Inventor: Yasuyuki Yamazaki, Toyokawa (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 525 days.

(21) Appl. No.: 14/402,123

(22) PCT Filed: Mar. 21, 2013

(86) PCT No.: PCT/JP2013/058064
§ 371 (c)(1),
(2) Date: Nov. 19, 2014

(87) PCT Pub. No.: WO2014/002544
PCT Pub. Date: Jan. 3, 2014

(65) Prior Publication Data
US 2015/0137594 A1    May 21, 2015

(30) Foreign Application Priority Data
Jun. 28, 2012 (JP) ................................. 2012-145032

(51) Int. Cl.
*B60L 1/00* (2006.01)
*B60L 3/00* (2006.01)
(Continued)

(52) U.S. Cl.
CPC ............. *B60L 11/1811* (2013.01); *B60L 1/00* (2013.01); *B60L 11/1816* (2013.01);
(Continued)

(58) Field of Classification Search
CPC .... B60L 1/00; B60L 11/1811; B60L 11/1816; B60L 11/1868; B60L 2210/10;
(Continued)

(56) References Cited

U.S. PATENT DOCUMENTS

2008/0316774 A1* 12/2008 Ito ............................ B60K 6/48
363/17
2011/0133694 A1    6/2011 Song
(Continued)

FOREIGN PATENT DOCUMENTS

EP    2653336 A1    10/2013
JP    4-325801 A    11/1992
(Continued)

*Primary Examiner* — Rexford Barnie
*Assistant Examiner* — Toan Vu
(74) *Attorney, Agent, or Firm* — Birch, Stewart, Kolasch & Birch, LLP

(57) ABSTRACT

While a drive battery (11) is charged, the output voltage of a DC-DC converter (20) is set to a first predetermined voltage (e.g. 14.4 V) at which thermal runaway does not occur even if the temperature of an auxiliary battery (19) is high and at which the auxiliary battery (19) can be charged even if the temperature thereof is low. During warm-up operation of the auxiliary battery (19), the output voltage of the DC-DC converter (20) is set to a second predetermined voltage (e.g. 14.3 V) lower than the first predetermined voltage. While the vehicle (10) is traveling, the output voltage of the DC-DC converter (20) is set to a third predetermined voltage (e.g. 14.2 V) lower than the second predetermined voltage. If lamps (17) are lit, the output voltage of the DC-DC converter (20) is set to a fourth predetermined voltage (e.g. 13.9 V).

3 Claims, 2 Drawing Sheets

(51) Int. Cl.
*B60L 11/18* (2006.01)
*H01M 10/44* (2006.01)
*H02J 7/34* (2006.01)

(52) U.S. Cl.
CPC ......... *B60L 11/1868* (2013.01); *H01M 10/44* (2013.01); *H02J 7/345* (2013.01); *B60L 2210/10* (2013.01); *B60L 2210/12* (2013.01); *B60L 2240/36* (2013.01); *B60L 2240/547* (2013.01); *B60L 2240/80* (2013.01); *Y02T 10/7011* (2013.01); *Y02T 10/7016* (2013.01); *Y02T 10/7066* (2013.01); *Y02T 10/7072* (2013.01); *Y02T 10/7233* (2013.01); *Y02T 10/92* (2013.01); *Y02T 90/127* (2013.01); *Y02T 90/14* (2013.01)

(58) Field of Classification Search
CPC ............. B60L 2210/12; B60L 2240/36; B60L 2240/547; B60L 2240/80; H01M 10/44; H02J 7/345; Y02T 10/7011; Y02T 10/7016; Y02T 10/7066; Y02T 10/7072; Y02T 10/7233; Y02T 10/92
USPC ........................................................ 307/10.1
See application file for complete search history.

(56) References Cited

U.S. PATENT DOCUMENTS

2011/0187184 A1* 8/2011 Ichikawa ................ B60L 1/003
307/10.1
2012/0299377 A1 11/2012 Masuda et al.

FOREIGN PATENT DOCUMENTS

| JP | 7-15807 A | 1/1995 |
|---|---|---|
| JP | 7-111735 A | 4/1995 |
| JP | 2850922 B2 | 1/1999 |
| JP | 2003-37903 A | 2/2003 |
| JP | 2008-86060 A | 4/2008 |
| JP | 2011-55682 A | 3/2011 |
| JP | 2012-10503 A | 1/2012 |
| WO | WO 2011/099116 A1 | 8/2011 |
| WO | WO 2012/081103 A1 | 8/2012 |

* cited by examiner

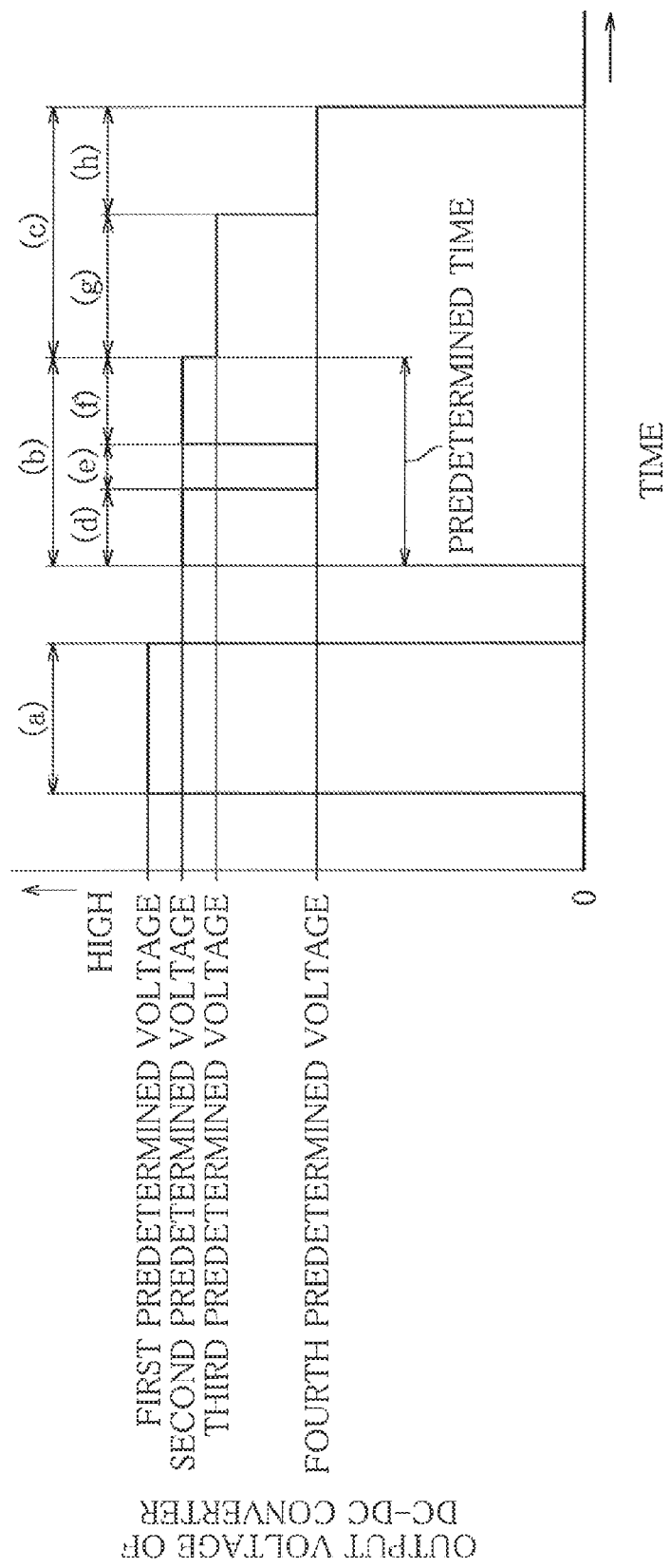

CHARGE CONTROL DEVICE FOR ELECTRICALLY DRIVEN VEHICLE

TECHNICAL FIELD

The present invention relates to a charge control device for an electrically driven vehicle, and more particularly, to charge control for an auxiliary battery.

BACKGROUND ART

Conventional electrically driven vehicles, such as an electric automobile or hybrid automobile using an electric motor for traveling, are equipped with two types of storage battery, namely, a high-voltage battery (drive battery) storing high-voltage power for driving the electric motor, and a low-voltage battery (auxiliary battery) storing low-voltage power for driving auxiliary equipment of the vehicle, such as lamps. The drive battery is charged with electric power supplied from an exterior charging device situated outside the vehicle. The auxiliary battery is charged as it is supplied with electric power from the drive battery via a voltage converter (DC-DC converter) for converting high-voltage power to low-voltage power.

The auxiliary battery generally comprises a lead-acid storage battery and generates heat during charging. Also, as the ambient temperature or the temperature of the auxiliary battery itself rises, a highest allowable voltage at and below which the auxiliary battery can be charged lowers, and if charging is performed at a voltage higher than the highest allowable voltage, heat generation is furthered by the charging, causing thermal runaway (thermorunaway) in which the temperature of the auxiliary battery becomes uncontrollable. Further, a lowest allowable voltage at and above which the auxiliary battery can be charged rises as the ambient temperature or the temperature of the auxiliary battery itself lowers, and where charging is performed at a voltage lower than the lowest allowable voltage, the auxiliary battery fails to be charged, causing insufficient charging.

Patent Document 1 discloses a power supply system for an electric vehicle, in which the temperature of the auxiliary battery is detected by a temperature sensor or the like and the charging voltage is set variably in accordance with the temperature of the auxiliary battery.

The use of a temperature sensor for detecting the temperature of the auxiliary battery is, however, undesirable because it leads to increase of cost.

In Patent Document 2, the state of the auxiliary battery (low-voltage battery) is determined and the charging voltage is set on the basis of the engine cooling water temperature detected by an engine cooling water temperature sensor and the outside air temperature detected by an outside air temperature sensor, instead of using a temperature sensor for detecting the temperature of the auxiliary battery, thereby restraining increase of cost due to the use of an additional temperature sensor.

CITATION LIST

Patent Literature

Patent Document 1: Japanese Unexamined Patent Publication No. 2012-10503
Patent Document 2: Japanese Unexamined Patent Publication No. 2008-86060

SUMMARY OF INVENTION

Technical Problem

In the charge control device for an automotive battery disclosed in Patent Document 2, the state of the auxiliary battery is determined and the charging voltage is set on the basis of the detection result provided by the engine cooling water temperature sensor.

In the case of an electric automobile using an electric motor alone for traveling, however, no engine is mounted, and thus it is not possible to estimate the warm-up state of the auxiliary battery on the basis of the detection result provided by such an engine cooling water temperature sensor.

It is therefore difficult to variably set the charging voltage for the auxiliary battery in accordance with the warm-up state of the auxiliary battery, so that the amount of electric power output from the drive battery possibly increases, causing increase of electric power consumption of the drive battery.

The present invention was made to solve the above problem, and an object thereof is to provide a charge control device for an electrically driven vehicle whereby charging can be reliably performed while at the same time electric power consumption of a drive battery can be restrained.

Solution to Problem

To achieve the above object, the present invention provides a charge control device for an electrically driven vehicle, including: a first storage battery which is charged with electric power supplied from an electric power supply device situated outside the vehicle and which supplies electric power to an electric motor for driving the vehicle; a voltage conversion unit which lowers voltage of electric power output from the first storage battery; a second storage battery which is charged with electric power output from the voltage conversion unit and which supplies electric power to auxiliary equipment of the vehicle; and a voltage setting unit which sets an output voltage of the voltage conversion unit, wherein the voltage setting unit sets the output voltage of the voltage conversion unit to a first predetermined voltage when the first storage battery is being charged with the vehicle and the electric power supply device electrically connected to each other, and the voltage setting unit sets the output voltage of the voltage conversion unit to a second predetermined voltage lower than the first predetermined voltage when the vehicle is started with the vehicle electrically disconnected from the electric power supply device, to charge the second storage battery (claim 1).

Preferably, the voltage setting unit sets the output voltage of the voltage conversion unit to a third predetermined voltage lower than the second predetermined voltage after a lapse of a predetermined time during which the second storage battery is warmed up (claim 2).

Also, the voltage setting unit preferably varies the predetermined time depending on length of a period from transition of the voltage conversion unit from an operating to a non-operating state to resumption of the operating state by the voltage conversion unit (claim 3).

Advantageous Effects of Invention

With the charge control device according to the present invention, while charging is performed by the electric power supply device, the output voltage of the voltage conversion unit is set to the first predetermined voltage, and while charging is not performed by the electric power supply device, the output voltage of the voltage conversion unit is set to the second predetermined voltage lower than the first predetermined voltage. Thus, while the vehicle is able to be supplied with electric power from outside, the output voltage of the voltage conversion unit can be set to a sufficiently high voltage. On the other hand, while the vehicle is unable to be supplied with electric power from outside, the second storage battery is charged at a lower output voltage taking account of electric power consumption of the first storage battery, whereby the electric power consumption of the first storage battery can be minimized (claim 1).

Also, while the vehicle is traveling, the output voltage of the voltage conversion unit is set to the third predetermined voltage lower than the second predetermined voltage, and since even less electric power is extracted from the first storage battery, electric power consumption of the first storage battery can be further reduced (claim 2).

Further, the predetermined time is varied depending on the length of the period from the transition of the voltage conversion unit from an operating to a non-operating state to the resumption of the operating state by the voltage conversion unit. Accordingly, in a situation where the vehicle is stopped and then again run in a short period and thus the warming up of the second storage battery is completed when the vehicle is run again, for example, the predetermined time may be shortened to curtail the warm-up operation of the second storage battery.

Since extraction of electric power from the first storage battery can be decreased, electric power consumption of the first storage battery can be further reduced (claim 3).

BRIEF DESCRIPTION OF DRAWINGS

FIG. 2 illustrates an exemplary temporal change of output voltage of a DC-DC converter in the charge control device according to the present invention.

DESCRIPTION OF EMBODIMENTS

Figure 1:
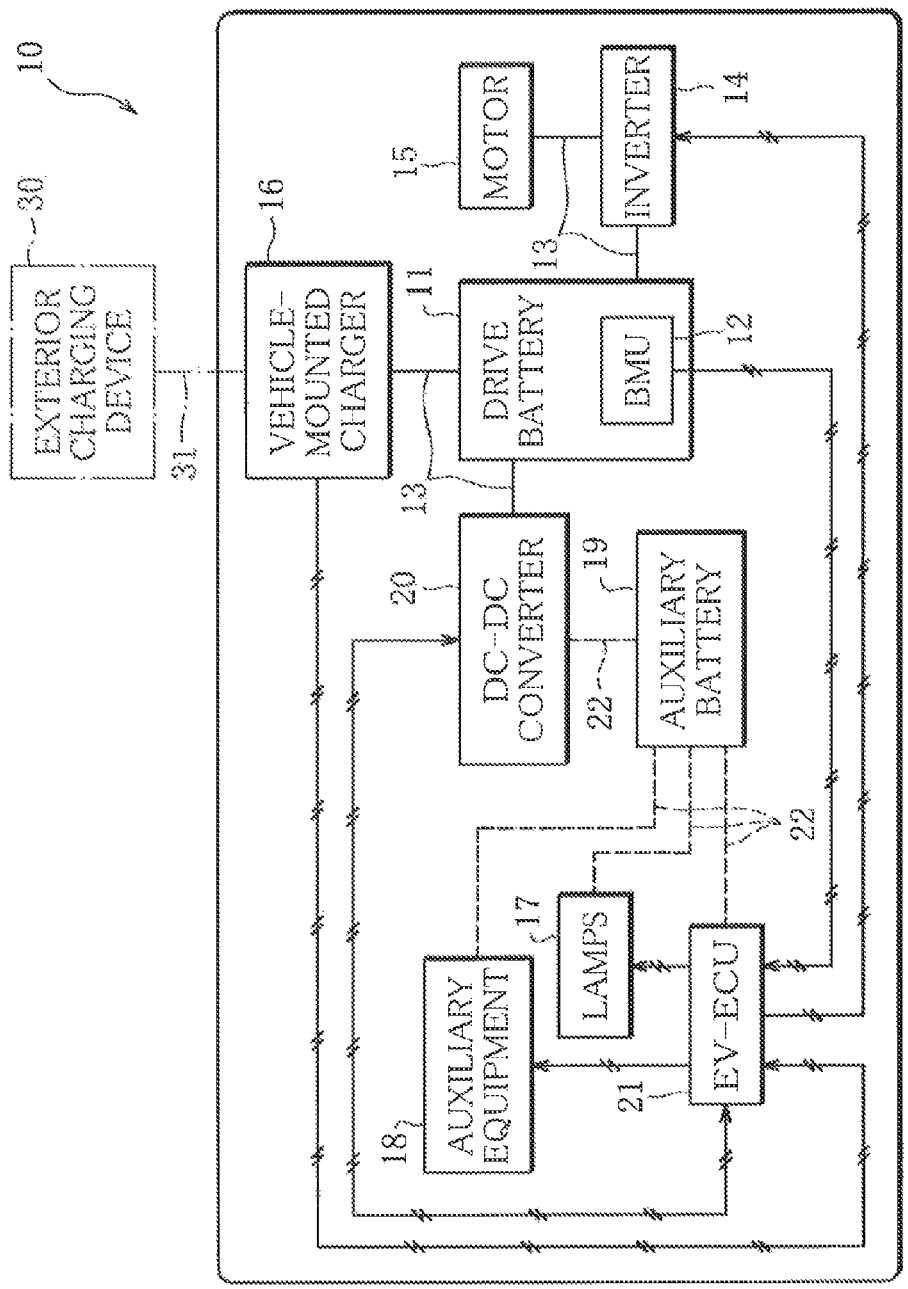
FIG. 1 illustrates a schematic configuration of a charge control device for an electrically driven vehicle according to the present invention.

An embodiment of the present invention will be described below with reference to the drawings.

FIG. 1 illustrates a schematic configuration of a charge control device for an electrically driven vehicle according to the present invention. In the figure, the solid lines indicate a high-voltage circuit 13, the broken lines indicate a low-voltage circuit 22, and the dot-dash line indicates a charging cable 31. FIG. 2 illustrates an exemplary temporal change of output voltage of a DC-DC converter in the charge control device according to the present invention. In FIG. 2, (a) denotes a period in which a drive battery 11 is charged with electric power from an exterior charging device 30 situated outside the vehicle, that is, a duration of charging of the drive battery 11, (b) denotes a period of warm-up operation of an auxiliary battery 19, and (c) denotes a period in which the vehicle 10 is running. The warm-up operation period starts when the main power supply of the vehicle 10 is turned on, and terminates when a predetermined time (e.g. 40 minutes) elapses. The predetermined time is determined beforehand by experimentation and the like. Also, in FIG. 2, (e) and (h) each denote a period in which lamps 17 are lit. Further, in FIG. 2, the periods in which the output voltage of the DC-DC converter 20 is at "0" (zero) are periods in which the main power supply of the vehicle 10 is switched off. In the following, the configuration of the charge control device for an electrically driven vehicle will be described.

The vehicle 10 to which the charge control device according to the present invention is applied is an electrically driven vehicle, as shown in FIG. 1. The vehicle 10 is equipped, as a travel device, with a motor (electric motor) 15 which is supplied with high-voltage power from the drive battery (first storage battery) 11 via the high-voltage circuit 13 and of which the operation is controlled by an inverter 14. The drive battery 11 can be charged by a vehicle-mounted charger 16 with the charging cable 31 from the exterior charging device (electric power supply device) 30 connected to the charging inlet lid of the vehicle 10. The lamps (auxiliary equipment) 17 and other auxiliary equipment 18 of the vehicle 10 operate when supplied with low-voltage power from the auxiliary battery (second storage battery) 19 via the low-voltage circuit 22.

As illustrated in FIG. 1, the charge control device of the present invention comprises the drive battery 11 mounted on the vehicle 10, the vehicle-mounted charger 16, the lamps 17, the auxiliary battery 19, the DC-DC converter (voltage conversion unit) 20, and an electronic control unit (voltage setting unit) 21 (hereinafter referred to as EV-ECU), which is a control device for performing integrated control of the vehicle 10 and includes input/output devices, storage devices (ROM, RAM, nonvolatile RAM, etc.), and a central processing unit (CPU). The individual devices are electrically connected.

The drive battery 11 is a secondary battery such as lithium-ion secondary battery. Also, the drive battery 11 comprises a battery module constituted by a plurality of modules each including a plurality of cells associated with a cell monitoring unit for monitoring the cells, and a battery monitoring unit (hereinafter referred to as BMU) 12 for monitoring the temperature, remaining capacity and the like of the battery module on the basis of the outputs of the cell monitoring units. The drive battery 11 is charged as it is supplied with high-voltage power (e.g. 300 V DC) from the exterior charging device 30 via the vehicle-mounted charger 16. Also, the drive battery 11 supplies electric power to the motor 15 via the inverter 14 or to the auxiliary battery 19 via the DC-DC converter 20.

The vehicle-mounted charger 16 supplies the electric power from the exterior charging device 30 to the drive battery 11 after converting the voltage of the electric power supplied thereto to a voltage that can be stored in the drive battery 11.

The lamps 17 are headlamps mounted at the front of the vehicle 10. The lamps 17 operate in response to the driver's manipulation or in accordance with a signal from the EV-ECU 21.

The auxiliary battery 19 is a secondary battery such as lead-acid storage battery. The auxiliary battery 19 is charged as it is supplied with low-voltage power from the drive battery 11 via the DC-DC converter 20. Also, the auxiliary battery 19 supplies low-voltage power to the lamps 17, the EV-ECU 21, and the auxiliary equipment 18 of the vehicle 10, such as direction indicators, via the low-voltage circuit 22.

The DC-DC converter 20 converts the voltage of the electric power supplied from the drive battery 11 to a voltage at which the electric power can be stored in the auxiliary battery 19 and be supplied to the lamps 17, the EV-ECU 21 and the auxiliary equipment 18 of the vehicle 10, such as direction indicators, and supplies the converted electric power to the lamps 17 and the auxiliary equipment 18 via the auxiliary battery 19. The output voltage of the DC-DC converter 20 is controlled by the EV-ECU 21.

The EV-ECU 21, which is a control device for performing integrated control of the vehicle 10, comprises input/output devices, storage devices (ROM, RAM, nonvolatile RAM, etc.), a central processing unit (CPU), and timers.

The input side of the EV-ECU 21 is connected with the aforementioned EMU 12 of the drive battery 11, the inverter 14, the vehicle-mounted charger 16 and the DC-DC converter 20, and input with information detected by these devices.

On the other hand, the output side of the EV-ECU 21 is connected to the inverter 14, the lamps 17, the auxiliary equipment 18, and the DC-DC converter 20.

The EV-ECU 21 variably controls the output voltage of the DC-DC converter 20 depending on whether the drive battery 11 is being charged or not, whether the vehicle 10 is traveling or stopped, and whether the lamps 17 are lit or not. Specifically, as illustrated in FIG. 2, when the drive battery 11 is being charged by the exterior charging device 30, the output voltage of the DC-DC converter 20 is set to a first predetermined voltage (e.g. 14.4 V), which is an upper-limit voltage at and below which thermal runaway (thermorunaway) is not caused even if the temperature of the auxiliary battery 19 is high ((a) in FIG. 2). The first predetermined voltage may be set to a desired value insofar as thermal runaway (thermorunaway) is not caused at the set voltage even if the temperature of the auxiliary battery 19 is high, and may be a voltage close to the upper-limit voltage. During the period of warm-up operation of the auxiliary battery 19 from the start of operation of the DC-DC converter 20 with the main power supply of the vehicle 10 turned on until the expiry of the predetermined time (e.g. 40 minutes), the output voltage of the DC-DC converter 20 is set to a second predetermined voltage (e.g. 14.3 V) lower than the first predetermined voltage ((d) and (f) in FIG. 2). While the vehicle 10 is traveling, the output voltage of the DC-DC converter 20 is set to a third predetermined voltage (e.g. 14.2 V) lower than the second predetermined voltage ((g) in FIG. 2). If the lamps 17 are lit during warm-up operation of the auxiliary battery 19 or during traveling of the vehicle 10, the output voltage of the DC-DC converter 20 is set to a fourth predetermined voltage (e.g. 13.9 V) lower than the third predetermined voltage ((e) and (h) in FIG. 2).

Thus, with the charge control device according to the present invention, when the drive battery 11 is being charged, the output voltage of the DC-DC converter 20 is set to the first predetermined voltage (e.g. 14.4 V), which is the upper-limit voltage at and below which thermal runaway (thermorunaway) of the auxiliary battery 19 does not occur, or to a voltage close to the upper-limit voltage. It is therefore possible to omit detection of the temperature of the auxiliary battery 19 by means of a temperature sensor or the like, thereby restraining increase of cost accompanying the provision of the temperature sensor or the like, and also to prevent the occurrence of thermal runaway in which the temperature of the auxiliary battery 19 becomes uncontrollable due to heat generated by charging, as well as insufficient charging due to deficiency in the output voltage of the DC-DC converter 20 caused by low temperature of the auxiliary battery 19.

Also, since the auxiliary battery 19 is charged with the output voltage set to or near the upper-limit voltage at which thermal runaway does not occur, it is possible to efficiently charge the auxiliary battery 19.

Further, during the warm-up operation period of the auxiliary battery 19 in which the drive battery 11 is not charged, the output voltage of the DC-DC converter 20 is set to the second predetermined voltage (e.g. 14.3 V) lower than the first predetermined voltage. Since less electric power is extracted from the drive battery 11, electric power consumption of the drive battery 11 can be reduced. As a consequence, the distance of travel by means of the motor 15 can be increased.

Further, during traveling of the vehicle 10, the output voltage of the DC-DC converter 20 is set to the third predetermined voltage (e.g. 14.2 V) lower than the second predetermined voltage, and since even less electric power is extracted from the drive battery 11, electric power consumption of the drive battery 11 can be further reduced.

Also, the period of warm-up operation of the auxiliary battery 19 is set so as to start when the DC-DC converter 20 starts operating with the main power supply of the vehicle 10 turned on and terminate when the predetermined time (e.g. 40 minutes) elapses, and therefore, the warming up of the auxiliary battery 19 can be determined easily without using a temperature sensor or the like.

While the embodiment of the present invention has been described above, it is to be noted that the present invention is not limited to the foregoing embodiment.

For example, in the foregoing embodiment, the predetermined time is fixed, but the manner of setting the predetermined time is not particularly limited and the predetermined time may be set in a different way. For example, the predetermined time may be varied depending on the length of a period from the transition of the DC-DC converter 20 from an operating to a non-operating state to the resumption of the operating state by the DC-DC converter 20 such that in a situation where the vehicle 10 is stopped and then run again in a short period, for example, the predetermined time is shortened to curtail the warm-up operation of the auxiliary battery 19. In this case, it is possible to decrease extraction of electric power from the drive battery 11 and further restrain electric power consumption of the drive battery 11.

REFERENCE SIGNS LIST

10: vehicle
11: drive battery (first storage battery)
15: motor (electric motor)
17: lamps (auxiliary equipment)
18: auxiliary equipment
19: auxiliary battery (second storage battery)
20: DC-DC converter (voltage conversion unit)
21: EV-ECU (voltage setting unit)
30: exterior charging device (electric power supply device)

The invention claimed is:

1. A charge control device for an electrically driven vehicle, comprising:
   a first storage battery which is charged with electric power supplied from an electric power supply device situated outside the vehicle and which supplies electric power to an electric motor for driving the vehicle;
   a voltage conversion unit which lowers voltage of electric power output from the first storage battery;
   a second storage battery which is charged with electric power output from the voltage conversion unit and which supplies electric power to auxiliary equipment of the vehicle; and
   a voltage setting unit which sets an output voltage of the voltage conversion unit, wherein the voltage setting unit sets the output voltage of the voltage conversion unit to a first predetermined voltage when the first storage battery is being charged with the vehicle and the electric power supply device electrically connected to each other, and the voltage setting unit sets the output voltage of the voltage conversion unit to a second predetermined voltage lower than the first predetermined voltage when the vehicle is started with the vehicle electrically disconnected from the electric power supply device, to charge the second storage battery.

2. The charge control device according to claim 1, wherein:

the voltage setting unit sets the output voltage of the voltage conversion unit to a third predetermined voltage lower than the second predetermined voltage after a lapse of a predetermined time during which the second storage battery is warmed up.

3. The charge control device according to claim 2, wherein:

the voltage setting unit varies the predetermined time depending on length of a period from transition of the voltage conversion unit from an operating to a non-operating state to resumption of the operating state by the voltage conversion unit.

* * * * *